United States Patent [19]
Nagata

[11] Patent Number: 5,412,430
[45] Date of Patent: May 2, 1995

[54] IMAGE CODING METHOD AND IMAGE CODING APPARATUS

[75] Inventor: Atsushi Nagata, Katano, Japan

[73] Assignee: Matsushita Electric Industrial Co. Ltd., Osaka, Japan

[21] Appl. No.: 238,334

[22] Filed: May 4, 1994

Related U.S. Application Data

[63] Continuation of Ser. No. 922,772, Jul. 31, 1992, abandoned.

[30] Foreign Application Priority Data

Jul. 31, 1991 [JP] Japan ............................ 3-191603

[51] Int. Cl.$^6$ .............................................. H04N 7/137
[52] U.S. Cl. ......................................... 348/402; 348/407; 348/413; 375/252
[58] Field of Search ................ 348/402, 407, 413, 416; 375/27, 33; H04N 7/137

[56] References Cited

U.S. PATENT DOCUMENTS

| | | | |
|---|---|---|---|
| 4,703,351 | 10/1987 | Kondo . | |
| 4,833,535 | 5/1989 | Ozeki | 358/136 |
| 5,159,448 | 10/1992 | Kojima | 358/135 |

FOREIGN PATENT DOCUMENTS

| | | |
|---|---|---|
| 0395440 | 10/1990 | European Pat. Off. . |
| 0424026 | 4/1991 | European Pat. Off. . |

OTHER PUBLICATIONS

MPEG 91/228, Proposal Package, "Coded Representation of Picture and Audio Information", Nov., 1991.

IEEE Transactions of Communications, vol. 35, No. 6, Jun. 1987, pp. 637–645, Murakami et al., "15/30 Mbits/s Universal Digital TV Codec Using a Median Adaptive Predictive Coding Method", *paragraph IIA—paragraph IIB*.

Signal Processing: Image Communication, vol. 2, No. 2, Aug. 1990, Amsterdam, pp. 127–144, Puri et al., "Video Coding With Motion-Compensated Interpolation for CD-Rom Applications", *paragraph 4*.

*Primary Examiner*—Howard W. Britton
*Attorney, Agent, or Firm*—Wenderoth, Lind & Ponack

[57] ABSTRACT

In high efficiency coding of a motion image signal in transmission or recording of the motion image signal, plural prediction signals are determined by independently compensating a motion of reproduction signals of plural frames positioned before a frame to be coded. A linear combination of these prediction signals is used as derived a prediction signal. An error of the frame to be coded and the derived prediction signal is coded. As a result, the distortion of the prediction signal, that is, the prediction error is reduced, and the coding efficiency is enhanced.

20 Claims, 5 Drawing Sheets

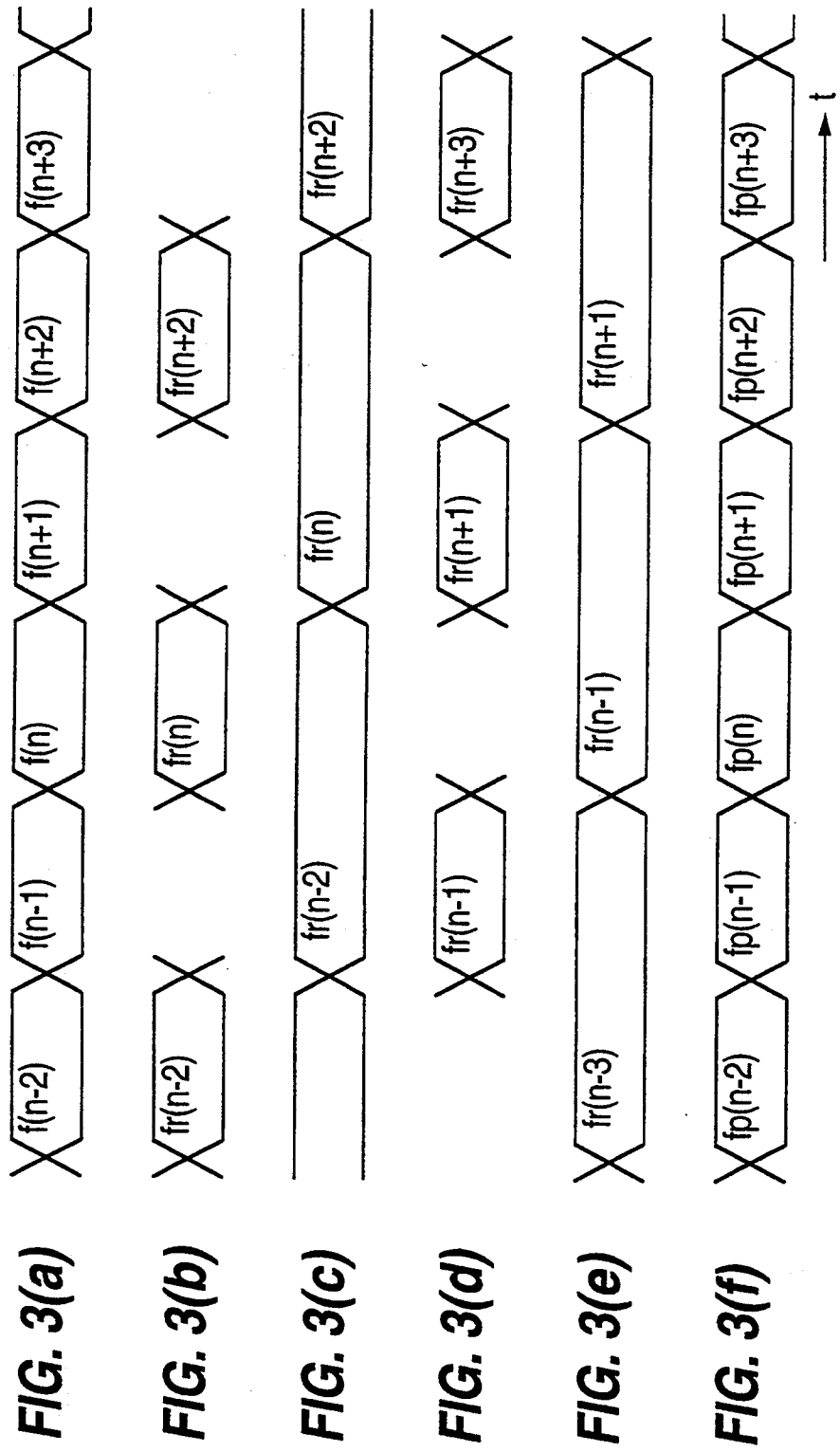

IMAGE CODING METHOD AND IMAGE CODING APPARATUS

This application is a Continuation of now abandoned application, Ser. No. 07/922,772, filed Jul. 31, 1992, now abandoned.

BACKGROUND OF THE INVENTION

1. Field of the Invention

The present invention relates to an image coding method for high efficiency coding of motion image signals for transmission or recording of such motion image signals, and to an apparatus for performing the image coding method.

2. Description of the Prior Art

In the image coding apparatus, recently, together with the development of the television telephone and the television conference system, various high efficiency coding technologies have been realized. In particular, coding technology making use of inter-frame prediction coding is widely used in the image coding apparatus.

The inter-frame prediction coding system determines a prediction signal by predicting a frame to be encoded from another frame, and encodes a prediction error which is a difference between the frame to be encoded and the prediction signal. The prediction signal is determined using the following methods. (1) A reproduction signal of a frame before the intended frame to be encoded is delivered from a memory of a local decoder, and is compensated for motion to obtain a prediction signal. (2) A reproduction signal of a frame before the intended frame to be encoded and a reproduction signal of a frame after the intended frame are delivered from memories of a local decoder, and after they are compensated for motion, a mean value of them is determined as a prediction signal.

In the method (2), in other words, a frame located between two reproduction signals apart from each other by two frames or more is determined by motion compensating frame interpolation, and this frame is used as the prediction signal. One such prior art image coding apparatus is disclosed in EP90304841. The conventional image coding apparatus is explained below.

The motion picture signals entering the image coding apparatus are subjected to two types of prediction methods alternately on a frame by frame basis. The prediction method is the manner of determining the prediction signal. The first prediction method includes reading the reproduction signal two frames before from a frame memory of a local decoder, and compensating the read signal for motion to obtain a prediction signal, and the second predict method includes determining an image signal by motion compensating frame interpolation from preceding and succeeding reproduction frames as a predicting signal. Afterwards, a prediction error signal is determined which is a difference between the frame to be encoded and the prediction signal, and an encoded prediction error signal is the output signal of the image coding apparatus. The image coding apparatus, possessing a local decoder, decodes the code, determines the reproduction image, and stores it in a frame memory.

In such a configuration, however, a reproduction frame later in time is needed when determining the prediction signal from the reproduction frames before and after the frame to be coded, that is, the frame later in time must have been already coded. To realize this, it is necessary to change the time sequence of the frames of the motion picture signals entering the coding apparatus, and therefore the configuration of the coding apparatus is complicated.

SUMMARY OF THE INVENTION

It is hence a primary object of the invention to raise the coding efficiency by reducing the distortion of the prediction signal, and to simplify the configuration of the coding apparatus.

To achieve the above object, the invention presents an image coding method comprising the steps of compensating a motion of reproduction signals of N (N being an integer of 2 or more) frames positioned before a frame to be coded to obtain first to N-th prediction signals, determining a linear combination of the first to N-th prediction signals to obtain a prediction signal, and coding a difference of the frame to be coded and the prediction signal.

The invention also presents an image coding apparatus comprising coding means for coding a difference of a frame to be coded and a prediction signal to produce a prediction error code, decoding means for decoding the prediction error code to obtain a reproduction signal, memory means for storing the reproduction signal, motion compensating means for compensating a motion of N (N being an integer of 2 or more) frames before the frame to be coded in the reproduction signal stored in the memory means to obtain first to N-th prediction signals, and linear combining means for determining a linear combination of the first to N-th prediction signals to obtain the prediction signal.

Being thus composed, the invention is capable of determining N prediction signals by compensating the motion of the reproduction signals of N frames preceding the frame to be coded, and determining the prediction signal by linear combining of these prediction signals, so that the distortion of prediction signal can be reduced. As a result, the prediction error signal becomes small, and the coding efficiency is improved.

BRIEF DESCRIPTION OF THE DRAWINGS

FIG. 3 is a timing chart of the image coding apparatus of the first embodiment of the invention.

DESCRIPTION OF THE PREFERRED EMBODIMENTS

Figure 1:
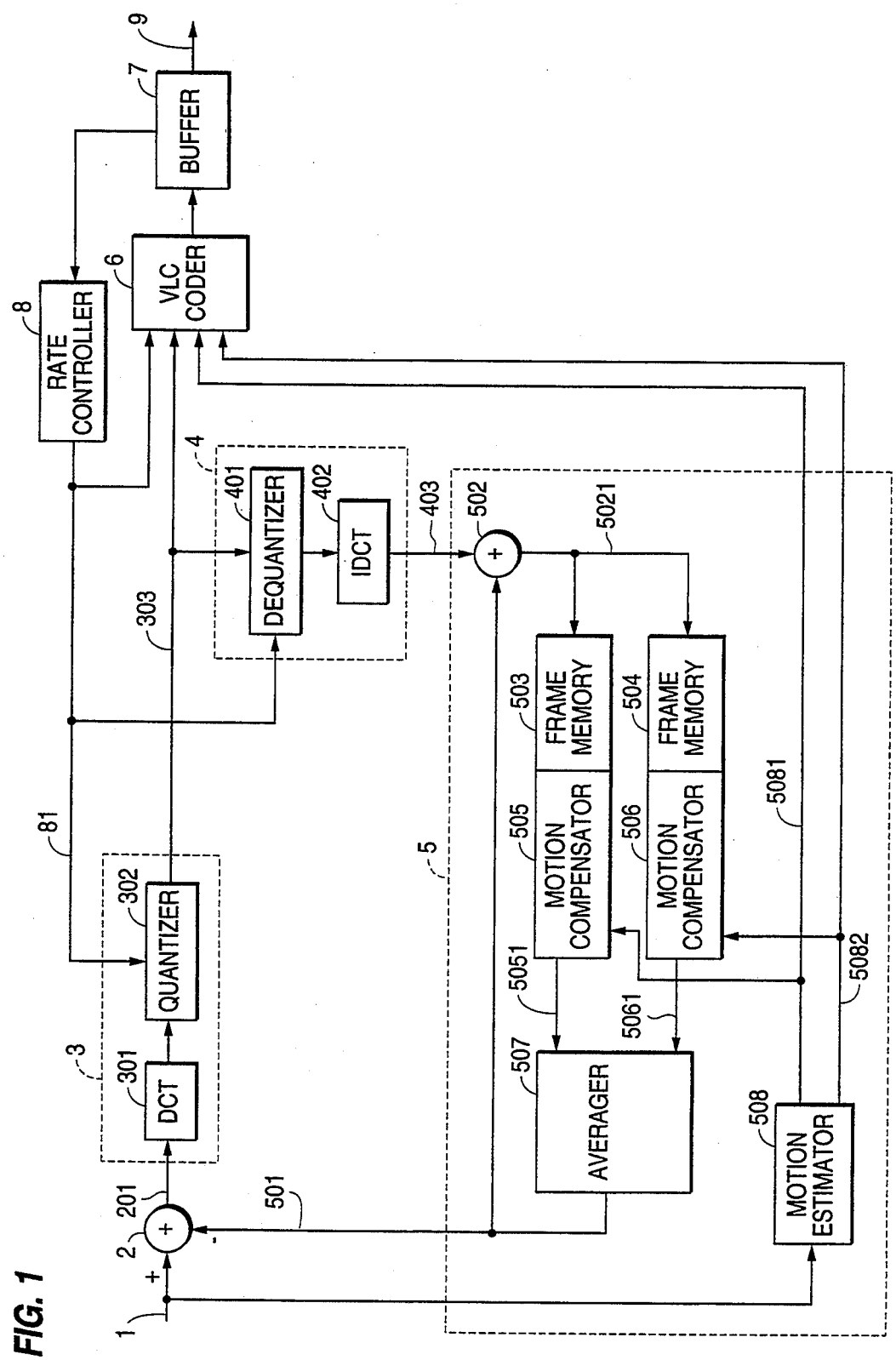
FIG. 1 is a block diagram of an image coding apparatus in a first embodiment of the invention.
Figure 2A:
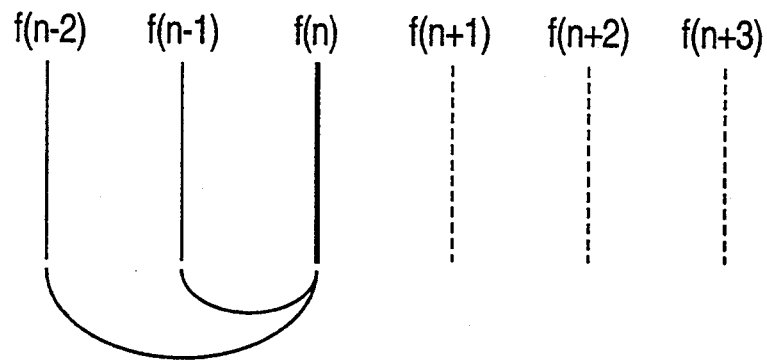
FIG. 2 is an explanatory diagram showing the relation between the frame of motion image signal to be coded, and a frame of reproduction signal used for determining a prediction signal, in the image coding apparatus of the first embodiment of the invention.
Figure 2B:
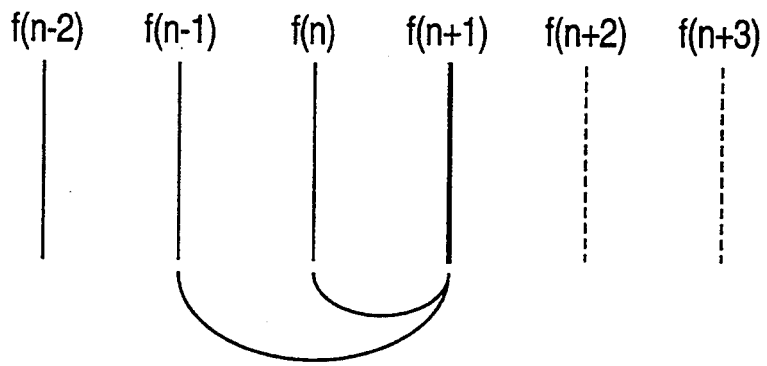
Figure 2C:
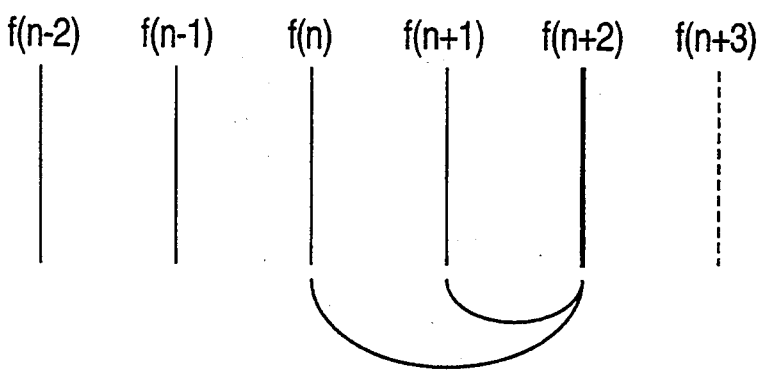
Figure 2D:
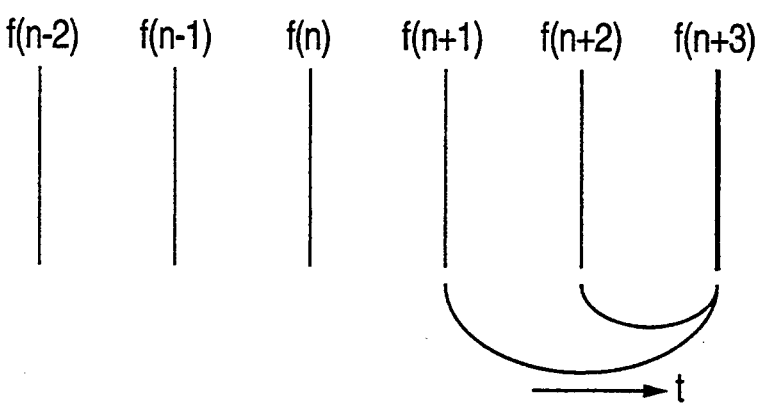

Referring now to the drawings, an embodiment of an image coding apparatus of the invention is described in detail below. FIG. 1 is a block diagram of an image coding apparatus in a first embodiment of the invention. In FIG. 1, numeral 1 denotes an input of the image coding apparatus, 2 is a prediction error calculator, 3 is a coder, 4 is a decoder, 5 is a prediction signal calculator, 6 is a variable length coder, 7 is a buffer memory, 8 is a rate controller, and 9 is an output of the image coding apparatus.

Numeral 301 is a discrete cosine transform (DCT) circuit, and 302 is a quantizer, which are combined to compose the coder 3. Numeral 401 is a dequantizer, and 402 is an inverse discrete cosine transform (IDCT) circuit, which are combined to compose the decoder 4. Numeral 502 is an adder, 503 is a first frame memory, 504 is a second frame memory, 505 is a first motion compensator, 506 is a second motion compensator, 507 is an averager, and 508 is a motion estimator, which are combined to compose the prediction signal calculator 5.

Numeral 201 is a prediction error signal produced by the prediction error calculator 2, 303 is a prediction error code produced by the coder 3, 403 is a reproduction predict error signal produced by the decoder 4, 501 is a prediction signal produced by the prediction signal calculator 5, 5021 is a reproduction signal produced by the adder 502, 5051 is a first prediction signal produced by the first motion compensator 505, 5061 is a second prediction signal produced by the second motion compensator 506, 5081 is a first motion vector produced by the motion estimator 508, 5082 is a second motion vector produced by the motion estimator 508, and 81 is the quantizing step size produced by the rate controller 8.

in the thus composed image coding apparatus, the operation is described below while referring to FIG. 1. The motion image signal to be coded is entered in the input 1 of the image coding apparatus, and is fed into the prediction error calculator 2 and the predict signal calculator 5. The predict error calculator 2 determines a difference of the motion image signal to be coded and the prediction signal 501, and produces the result as the prediction error signal 201. The coder 3 receives the prediction error signal 201, processes it by DCT (discrete cosine transform) in the DCT circuit 301, quantizes the obtained DCT coefficient value in the quantizer 302 according to the value of the quantizing step size 81, and produces the prediction error code 303. The decoder 4 receives the prediction error code 303, dequantizes it in the dequantizer 401 according to the value of the quantizing step size 81, processes the obtained DCT coefficient value by IDCT (inverse discrete cosine transform) in the IDCT circuit 402, and produces the reproduction prediction error signal 403. The variable length coder 6 receives the quantizing step size 81, prediction error code 303, first motion vector 5081, and second motion vector 5802, codes them in variable length, and writes the obtained data into the buffer memory 7. The data is read out of the buffer memory 7 at a specified rate, and produced into the output 9 of the image coding apparatus. The rate controller 8 controls the value of the quantizing step size 81 so that the amount of data remaining in the buffer memory 7 becomes a specified amount.

The prediction signal calculator 5 is a circuit for obtaining the prediction signal 501. The adder 502 adds the reproduction prediction error signal 403 and prediction signal 501, and produces the reproduction signal 5021. The reproduction signal 5021 is stored in the first frame memory 503 and second frame memory 504 alternately on a frame by frame basis. The first motion compensator 505 compensates the motion of the reproduction signal read out from the first frame memory by the first motion vector 5081, and produces the first prediction signal 5051. The second motion compensator 506 compensates the motion of the reproduction signal read out from the second frame memory 504 by the second motion vector 5082, and produces the second prediction signal 5061. The averager 507 determines an average of the first prediction signal 5051 and second prediction signal 5061, and produces the prediction signal 501. The motion estimator 508 determines and produces a motion vector of the image signal to be coded. The motion estimator 508 determines the motion vector between the image signal to be coded and the reproduction signal read out from the first frame memory 503, and produces the first motion vector 5081. It also determines the motion vector between the image signal to be coded and the reproduction signal read out from the second frame memory 504, and produces the second motion vector 5082.

Explained next is the relation between the frame of the motion image signal to be coded and the frame of the reproduction signal used for determining the prediction signal 501. FIG. 2 is an explanatory diagram showing the relation between the frame of motion image signal to be coded, and the frame of reproduction signal used for determining the prediction signal 501, in which $f(n-2)$ to $f(n+3)$ denote the $(n-2)$-th $(n+3)$-th frames of image signals. FIG. 2 (a) shows a case of coding the frame $f(n)$, in which the prediction signal is determined by motion compensation of the frame $f(n-2)$ and frame $f(n-1)$ of reproduction signals. FIG. 2 (b) shows a case of coding the frame $f(n+1)$, in which the prediction signal is determined by motion compensation of the frame $f(n-1)$ and frame $f(n)$ of reproduction signals. FIGS. 2 (c) and (d) show cases of coding the frame $f(n+2)$ and frame $f(n+3)$, respectively.

The operation timing of the image coding apparatus is described below while referring to FIG. 3. FIG. 3 shows the timing chart of the image coding apparatus. In FIG. 3, (a) is an input signal of the image coding apparatus, (b) is the reproduction signal written into the first frame memory 503, (c) is the reproduction signal given to the first motion compensator 505 from the first frame memory 503, (d) is the reproduction signal written into the second frame memory 504, (e) is the reproduction signal given to the second motion compensator 506 from the second frame memory 504, and (f) is the prediction signal 501. Further, fr(n) is a frame of reproduction signal obtained by coding and decoding the frame f(n) of input signal, and fp(N) is a frame of prediction signal for coding the frame f(n) of the input signal.

The reproduction signal 5021 is written into the first frame memory 503 and second frame memory 504 alternately on a frame by frame basis. When the frame f(n) is entered in the input 1 of the image coding apparatus as an input signal, the frame $fr(n-2)$ of the reproduction signal is read out from the first frame memory 503, and the motion is compensated by the first motion compensator 505, so that the first prediction signal 5051 is obtained. At the same time, the frame $fr(n-1)$ of the reproduction signal is read out from the second frame memory 504, and the motion is compensated in the second motion compensator 506, so that the second prediction signal 5061 is obtained. The averager 507 determines the average of the first prediction signal 5051 and second prediction signal 5061, and produces fp(n) as prediction signal 501.

In this way, since the average of the first and second predict signals is used as the prediction signal, the distortions contained in the first and second prediction signals which are low in correlation are reduced by determining the average of the two prediction signals. Thus, the distortion of prediction signal is decreased, that is, the prediction error is reduced, so that the coding efficiency is improved.

In the first embodiment, meanwhile, the prediction signal 501 was the average of two prediction signals, that is, the first prediction signal 5051 and second prediction signal 5052. But instead, by compensating the motion of N (N being an integer of 2 or more) reproduction frames, the first to N-th prediction signals can be determined, and the prediction signal 501 can be obtained by a linear combination thereof.

In the first embodiment, moreover, the distance between the frame to be coded and the frame of the first or second prediction signal is one or two frames, but this distance is not limitative.

A second embodiment of the invention is described below while referring to the accompanying drawings.

Figure 4:
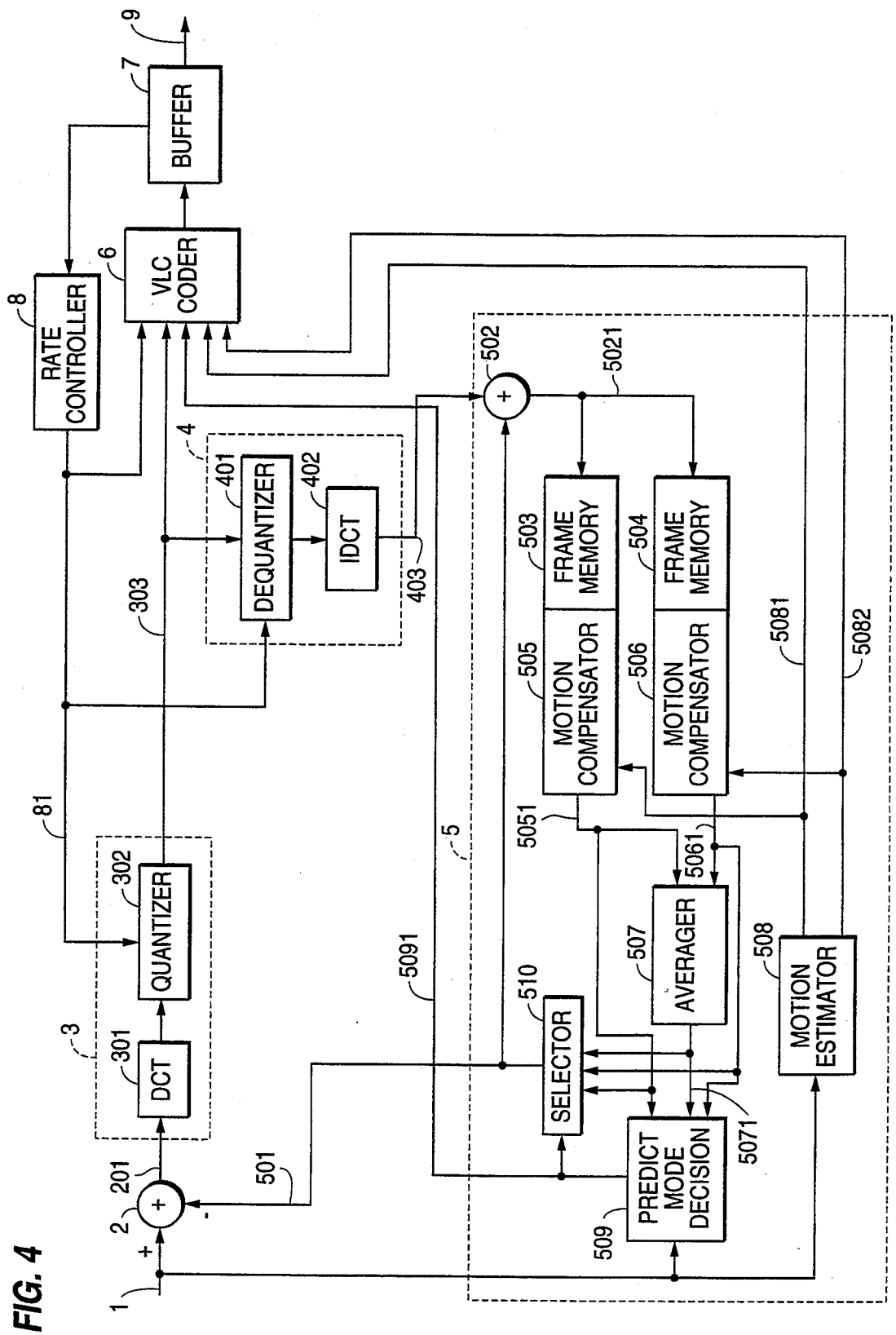
FIG. 4 is a block diagram of image coding apparatuses in second and third embodiments of the invention.
Figure 5A:
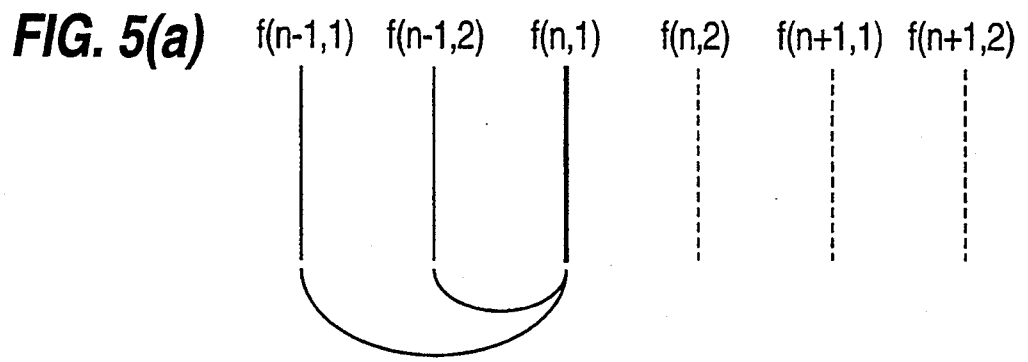
FIG. 5 is an explanatory diagram showing the relation between a frame of moving image signal to be coded, and a frame of reproduction signal used for determining a prediction signal, in the image coding apparatus of the third embodiment of the invention.
Figure 5B:
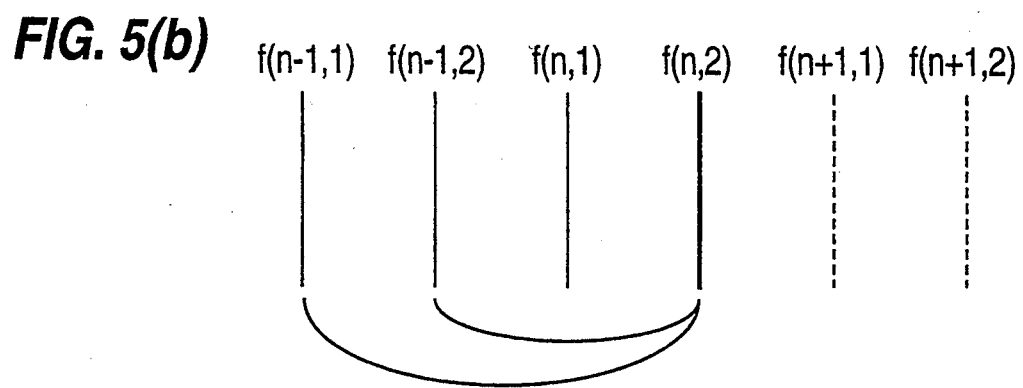
Figure 5C:
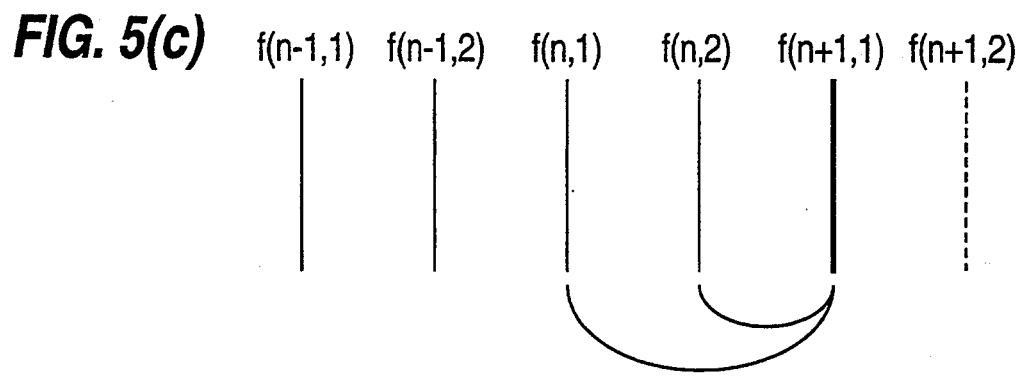
Figure 5D:
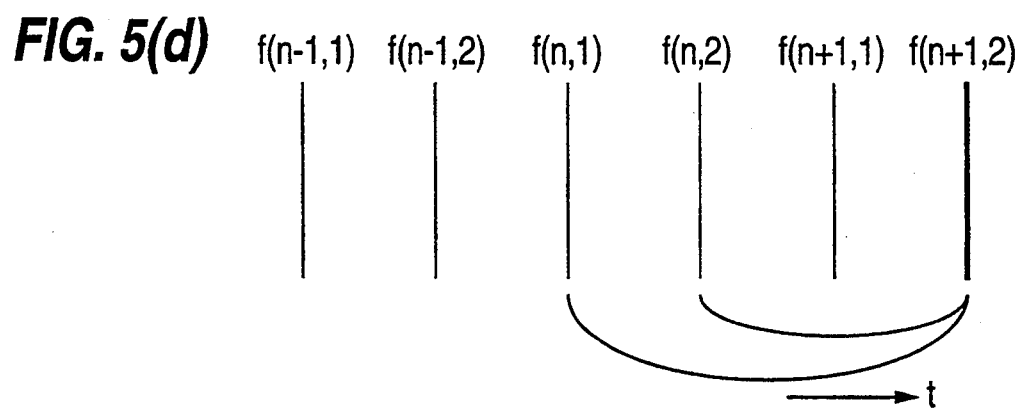

FIG. 4 is a block diagram of an image coding apparatus in the second embodiment of the invention. In FIG. 4, numeral 509 is a prediction mode decision circuit, 510 is a prediction signal selector, 5071 is a third prediction signal produced by an averager 507, and 5091 is a prediction mode signal produced by the prediction mode decision circuit 509. What is different from the first embodiment shown in FIG. 1 is the composition of the prediction signal calculator 5 and the input of the prediction mode signal 5091 in the variable length coder 6.

In the thus composed image coding apparatus, the operation is explained below while referring to FIG. 4.

The averager 507 determines an average of the first prediction signal 5051 and second prediction signal 5061, and produces the third prediction signal 5071. The prediction mode decision circuit 509 judges a smallest prediction error out of the incoming first to third prediction signals, and produces an index showing it as a prediction mode signal 5091. The prediction signal selector 510 selects one out of the first prediction signal 5051, second prediction signal 5061, and third prediction signal 5071, depending on the prediction mode signal 5091, and produces a selected signal as the prediction signal 501. The prediction signal 501 is the one having the smallest prediction error out of the first to third prediction signals. Further, the prediction mode signal 5091 is entered in the variable length coder 6, and is coded in variable length together with the quantizing step size 81, prediction error code 303, first motion vector 5081, and second motion vector 5082.

Thus, according to the second embodiment by installing the prediction mode decision circuit and prediction signal selector, the one having the smallest prediction error out of the first to third prediction signals is used as the prediction signal, so that the distortion of the prediction signal can be reduced further as compared with the case of using the average of the first and second prediction signals.

A third embodiment is explained below.

A block diagram of the third embodiment is the same as the second embodiment in FIG. 4. What is different from the second embodiment is that the motion image signal entering the input of the image coding apparatus is an interlaced scan signal. FIG. 5 is an explanatory diagram showing the relation between the frame of the motion image signal to be coded and the frame of reproduction signal used for determining the prediction signal 501, in the image coding apparatus of the third embodiment of the invention. In the third embodiment, since the image signal to be coded is of interlaced scan signal, the n-th frame is composed of field f (n, 1) and field f (n, 2). FIG. 5 (a) shows a case of coding the field f(n, 1), in which the prediction signal is determined by motion compensation of the field f(n−1, 1) and field f(n−1, 2) of reproduction signal. FIG. 5 (b) shows a case of coding the field (n, 2), in which the prediction signal is determined by motion compensation of the field f(n−1, 1) and field f(n−1, 2) of reproduction signal. FIGS. 5 (c) and (d) show cases of determining the field f(n+1, 1) and field f(n+1, 2).

Thus, when the interlaced motion image signal is coded by the coding apparatus in the third embodiment, the distortion of the prediction signal can also be reduced in the same way as in the second embodiment. Furthermore, since the first prediction signal and second prediction signal are reproduction signals which are different from each other, an efficient prediction is realized for a moving image signal.

In the third embodiment, the two fields used for determining the prediction signal belong to one same frame, but the two fields may instead belong to different frames.

In the third embodiment, moreover, the distance between the frame to be coded and the frame of the first or second prediction signal is one frame, but this distance is not limitative.

What is claimed is:

1. An image coding method comprising the steps of:
   compensating a motion of reproduction signals of N (N being an integer of 2 or more) frames positioned before a frame to be coded to obtain first to N-th prediction signals:
   determining a linear combination of the first to N-th prediction signals to obtain a corresponding derived prediction signal; and
   coding a difference between the frame to be coded and the derived prediction signal.

2. An image coding method comprising the steps of:
   compensating a motion of reproduction signals of two frames positioned before a frame to be coded to obtain a first prediction signal and a second prediction signal;
   determining an average of the first prediction signal and the second prediction signal to obtain a corresponding third prediction signal; and
   coding a difference between the frame to be coded and the average prediction signal.

3. An image coding method comprising the steps of:
   compensating a motion of reproduction signals of two frames positioned before a frame to be coded to obtain a first prediction signal and a second prediction signal;
   determining an average of the first prediction signal and the second prediction signal to obtain a corresponding third prediction signal;
   determining a size of a prediction error of the first, second and third prediction signals in each block composed of a set of plural pixels;
   selecting one prediction signal having a smallest prediction error from among the first, second and third prediction signals to obtain a selected prediction signal; and
   coding a difference between the frame to be coded and the selected prediction signal.

4. An image coding method comprising the steps of:
   compensating a motion of reproduction signals of two frames positioned before a frame to be coded to obtain a first prediction signal and a second prediction signal;

determining an average of the first prediction signal and the second prediction signal to obtain a corresponding third prediction signal;

selecting one prediction signal from among at least two prediction signals including the third prediction signal to obtain a selected prediction signal; and coding a difference between the selected prediction signal and the frame to be coded.

5. An image coding apparatus comprising:

coding means for coding a difference between a frame to be coded and a derived prediction signal to produce a prediction error code;

decoding means for decoding the prediction error code to obtain a reproduction signal;

memory means for storing the reproduction signal;

motion compensating means for compensating a motion of N (N being an integer of 2 or more) frames before the frame to be coded in the reproduction signal stored in the memory means to obtain first to N-th prediction signals; and linear combining means for determining a linear combination of the first to N-th prediction signals to obtain the derived prediction signal.

6. An image coding apparatus comprising:

coding means for coding a difference between a frame to be coded and a selected prediction signal to produce a prediction error code;

decoding means for decoding the prediction error code to obtain a reproduction signal;

memory means for storing the reproduction signal;

motion compensating means for compensating a motion of N (N being an integer of 2 or more) frames before the frame to be coded in the reproduction signal stored in the memory means to obtain first to N-th prediction signals;

linear combining means for determining a linear combination of the first to the N-th prediction signals to obtain a corresponding derived prediction signal of a linear combination; and selector means for selecting one prediction signal from among at least two prediction signals including the derived prediction signal of the linear combination to obtain the selected prediction signal.

7. An image coding apparatus comprising:

prediction error calculating means for producing as a prediction error signal a difference between a frame to be coded and a prediction signal;

coding means for coding the prediction error signal to produce a selected prediction error code;

decoding means for decoding the prediction error code to obtain a reproduction signal;

memory means for storing the reproduction signal;

compensating means for compensating a motion of two frames positioned before the frame to be coded in the reproduction signal stored in the memory means to obtain a first prediction signal and a second prediction signal;

averaging means for determining an average of the first prediction signal and the second prediction signal to obtain a corresponding third prediction signal; and prediction error calculating means for determining a size of a prediction error of the first, second and third prediction signals in every block which is a set of plural pixels; and means for selecting one prediction signal having a smallest prediction error from among the first, second and third prediction signals as the selected prediction signal.

8. An image coding apparatus comprising:

prediction error calculating means for producing as a prediction error signal a difference between a frame to be coded and a selected prediction signal;

coding means for coding the prediction error signal to produce a prediction error code;

decoding means for decoding the prediction error code to obtain a reproduction signal;

memory means for storing the reproduction signal;

compensating means for compensating a motion of two frames positioned before the frame to be coded in the reproduction signal stored in the memory means to obtain a first prediction signal and a second prediction signal;

averaging means for determining an average of the first prediction signal and the second prediction signal to obtain a corresponding third prediction signal; and selector means for selecting one prediction signal from among at least two prediction signals including the third prediction signal to obtain the selected prediction signal.

9. An image coding apparatus for coding an interlaced scan motion image signal comprising:

prediction error calculating means for producing as a prediction error signal a difference between a field to be coded and a selected prediction signal;

coding means for coding the prediction error signal to produce a prediction error code;

decoding means for decoding the prediction error code to obtain a reproduction signal;

memory means for storing the reproduction signal;

motion compensating means for compensating a motion of a first field and a second field positioned before the field to be coded in the reproduction signal stored in the memory means to obtain a first prediction signal and a second prediction signal;

averaging means for determining an average of the first prediction signal and the second prediction signal to obtain a corresponding third prediction signal; and prediction error calculating means for determining a size of a prediction error of the first, second and third prediction signals in every block which is a set of plural pixels; and means for selecting one prediction signal having a smallest prediction error from among the first, second and third prediction signals as the selected prediction signal.

10. An image coding apparatus for coding an interlaced scan motion image signal, comprising:

prediction error calculating means for producing as a prediction error signal a difference between a field to be coded and a selected prediction signal;

coding means for coding the prediction error signal to produce a prediction error code;

decoding means for decoding the prediction error code to obtain a reproduction signal;

memory means for storing the reproduction signal;

motion compensating means for compensating a motion of a first field and a second field positioned before the field to be coded in the reproduction signal stored in the memory means to obtain a first prediction signal and a second prediction signal;

averaging means for determining an average of the first prediction signal and the second prediction signal to obtain a corresponding third prediction signal; and selector means for selecting one prediction signal from among at least two prediction signals including the third prediction signal to obtain the selected prediction signal.

11. An image coding method for coding an interlaced scan motion image signal comprising:

producing as a prediction error signal a difference between a field to be coded and a selected prediction signal;

coding the prediction error signal to produce a prediction error code;

decoding the prediction error code to obtain a reproduction signal;

storing the reproduction signal in a memory;

compensating a motion of a first field and a second field positioned before the field to be coded in the reproduction signal stored in the memory to obtain a first prediction signal and a second prediction signal;

determining an average of the first prediction signal and the second prediction signal to obtain a corresponding third prediction signal; and determining a size of a prediction error of the first, second and third prediction signals in every block which is a set of plural pixels; and selecting one prediction signal having a smallest prediction error from among the first, second and third prediction signals as the selected prediction signal.

12. An image coding method for coding an interlaced scan motion image signal, comprising:

producing as a prediction error signal a difference between a field to be coded and a selected prediction signal;

coding the prediction error signal to produce a prediction error code;

decoding the prediction error code to obtain a reproduction signal;

storing the reproduction signal in a memory;

compensating a motion of a first field and a second field positioned before the field to be coded in the reproduction signal stored in the memory to obtain a first prediction signal and a second prediction signal;

determining an average of the first prediction signal and the second prediction signal to obtain a corresponding third prediction signal; and selecting one prediction signal from among at least two prediction signals including the third prediction signal to obtain the selected prediction signal.

13. An image coding method for coding an interlaced scan motion image signal comprising:

compensating a motion of reproduction signals of N fields positioned before a field to be coded to obtain first to N-th prediction signals, wherein N is an integer of 2 or more;

processing the first to N-th prediction signals to obtain a derived prediction signal; and coding a difference between the field to be coded and the derived prediction signal.

14. An image coding method for coding an interlaced scan motion image signal comprising:

compensating a motion of reproduction signals of N fields positioned before a field to be coded to obtain first to N-th prediction signals, wherein N is an integer of 2 or more;

determining a linear combination of the first to N-th prediction signals to obtain a corresponding derived prediction signal; and coding a difference between the field to be coded and the derived prediction signal.

15. An image coding method for coding an interlaced scan motion image signal comprising:

compensating a motion of reproduction signals of a first field and a second field positioned before a field to be coded to obtain a first prediction signal and a second prediction signal;

processing the first and second prediction signals to obtain a derived prediction signal; and coding a difference between the field to be coded and the derived prediction signal.

16. An image coding method for coding an interlaced scan motion image signal comprising:

compensating a motion of reproduction signals of a first field and a second field positioned before a field to be coded to obtain a first prediction signal and a second prediction signal;

determining a linear combination of the first and second prediction signals to obtain a corresponding derived prediction signal; and coding a difference between the field to be coded and the derived prediction signal.

17. An image coding apparatus for coding an interlaced scan motion image signal comprising:

prediction error calculating means for producing as a prediction error signal a difference between a field to be coded and a new prediction signal;

coding means for coding the prediction error signal to produce a prediction error code;

decoding means for decoding the prediction error code to obtain a reproduction signal;

memory means for storing the reproduction signal;

motion compensating means for compensating a motion of N fields positioned before the field to be coded in the reproduction signal stored in the memory means to obtain first to N-th prediction signals, where N is an integer of 2 or more; and means for processing the first to N-th prediction signals to obtain the new prediction signal.

18. An image coding apparatus for coding an interlaced scan motion image signal comprising:

prediction error calculating means for producing as a prediction error signal a difference between a field to be coded and a derived prediction signal;

coding means for coding the prediction error signal to produce a prediction error code;

decoding means for decoding the prediction error code to obtain a reproduction signal;

memory means for storing the reproduction signal;

motion compensating means for compensating a motion of a first field and a second field positioned before the field to be coded in the reproduction signal stored in the memory means to obtain a first prediction signal and a second prediction signal; and means for processing the first and second prediction signals to obtain the derived prediction signal.

19. An image coding apparatus for coding an interlaced scan motion image signal comprising:

prediction error calculating means for producing as a prediction error signal a difference between a field to be coded and a derived prediction signal;

coding means for coding the prediction error signal to produce a prediction error code;

decoding means for decoding the prediction error code to obtain a reproduction signal;

memory means for storing the reproduction signal;

motion compensating means for compensating a motion of N fields positioned before the field to be coded in the reproduction signal stored in the memory means to obtain first to N-th prediction signals, where N is an integer of 2 or more; and means for determining a linear combination of the first to N-th prediction signals to obtain the derived prediction signal.

20. An image coding apparatus for coding an interlaced scan motion image signal comprising:

prediction error calculating means for producing as a prediction error signal a difference between a field to be coded and a derived prediction signal;

coding means for coding the prediction error signal to produce a prediction error code;

decoding means for decoding the prediction error code to obtain a reproduction signal;

memory means for storing the reproduction signal;

motion compensating means for compensating a motion of a first field and a second field positioned before the field to be coded in the reproduction signal stored in the memory means to obtain a first prediction signal and a second prediction signal; and means for determining a linear combination of the first and second prediction signals to obtain the derived prediction signal.

* * * * *